United States Patent
Liu et al.

(10) Patent No.: US 8,743,085 B2
(45) Date of Patent: Jun. 3, 2014

(54) TOUCH INPUT DEVICE FOR SWITCHING DRIVING SIGNALS

(75) Inventors: Kai Ming Liu, Hsinchu County (TW); Shih Tzung Chou, Hsinchu County (TW); Ya Ling Lu, Pingtung County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 134 days.

(21) Appl. No.: 13/468,506

(22) Filed: May 10, 2012

(65) Prior Publication Data

US 2013/0033441 A1 Feb. 7, 2013

(30) Foreign Application Priority Data

Aug. 3, 2011 (TW) .............................. 100127517 A

(51) Int. Cl.
*G09G 5/00* (2006.01)

(52) U.S. Cl.
USPC ........ 345/174; 345/173; 345/178; 178/18.01; 178/18.06

(58) Field of Classification Search
USPC ................... 345/173–178; 178/18.01–18.06
See application file for complete search history.

(56) References Cited

U.S. PATENT DOCUMENTS

| | | | |
|---|---|---|---|
| RE40,867 E * | 8/2009 | Binstead | 341/33 |
| 7,663,607 B2 * | 2/2010 | Hotelling et al. | 345/173 |
| 2007/0198926 A1 * | 8/2007 | Joguet et al. | 715/702 |
| 2013/0027061 A1 * | 1/2013 | Hristov | 324/678 |

* cited by examiner

*Primary Examiner* — Jennifer Nguyen

(57) ABSTRACT

A touch input device for switching driving signals includes a touch panel and a panel driving circuit for driving the touch panel. The panel driving circuit includes a selecting circuit, a driving signal generating circuit, and a touch sensing circuit. The driving signal generating circuit transmits a driving signal to the touch panel. The selecting circuit includes a multiplexer, which controls sensing lines that do not comprise either an X directional measuring channel or a Y directional measuring channel to be grounded or floating in accordance with the driving signal.

6 Claims, 14 Drawing Sheets

| X:F;Y:G | X:F;Y:G | X:F;Y:G | X:G;Y:G | | X:G;Y:G | X:F;Y:G | X:F;Y:G | X:F;Y:G | X:F;Y:G | |
|---|---|---|---|---|---|---|---|---|---|---|
| X:F;Y:G | X:F;Y:G | X:F;Y:G | X:G;Y:G | | X:G;Y:G | X:F;Y:G | X:F;Y:G | X:F;Y:G | X:F;Y:G | |
| | | | | Touch | | | | | | |
| | | | | | | | | | S | |
| | | | | | | | | | R | |
| X:F;Y:G | X:F;Y:G | X:F;Y:G | X:G;Y:G | | X:G;Y:G | X:F;Y:G | X:F;Y:G | X:F;Y:G | X:F;Y:G | |
| X:F;Y:G | X:F;Y:G | X:F;Y:G | X:G;Y:G | | X:G;Y:G | X:F;Y:G | X:F;Y:G | X:F;Y:G | X:F;Y:G | |

FIG. 12

|  | | | | X7 | X6 | X5 | | | | |
|---|---|---|---|---|---|---|---|---|---|---|
| X:F; Y:F | X:F; Y:F | X:F; Y:F | X:G; Y:F | | X:G; Y:F | X:F; Y:F | X:F; Y:F | X:F; Y:F | | |
| X:F; Y:F | X:F; Y:F | X:F; Y:F | X:G; Y:F | | X:G; Y:F | X:F; Y:F | X:F; Y:F | X:F; Y:F | | |
| | | | | | | | | | | |
| | | | | Touch | | | | | R — Y3 | S — Y4 |
| X:F; Y:F | X:F; Y:F | X:F; Y:F | X:G; Y:F | | X:G; Y:F | X:F; Y:F | X:F; Y:F | X:F; Y:F | | |
| X:F; Y:F | X:F; Y:F | X:F; Y:F | X:G; Y:F | | X:G; Y:F | X:F; Y:F | X:F; Y:F | X:F; Y:F | | |

TOUCH INPUT DEVICE FOR SWITCHING DRIVING SIGNALS

The present invention claims priority from Taiwanese application Ser. No. 100127517, filed on Aug. 3, 2011, having common title and inventorship herewith.

BACKGROUND OF THE INVENTION

1. Field of the Invention

The present invention relates to a touch input device for switching driving signals, and more particularly, to a touch input device capable of switching different driving signals in accordance with different panels with different loading capacitance.

2. Description of the Related Art

Touch panels are widely applied in a variety of fields such as personal computers, smart phones, public information stations, home appliances, and industrial control devices. The touch panels include several categories including resistive touch screen, photoelectric touch screen, ultrasonic touch screen, flat capacitive touch screen, and projected capacitive touch screen, all of which are undergoing rapid advancements in technology. However, each of these touch screen categories will have drawbacks if applied to a common display panel, as each category has been developed specifically for a particular display.

FIG. 1 is a schematic view of a conventional touch panel 10. The touch panel 10 includes a plurality of X-directional sensing lines X1 to Xm, and a plurality of Y-directional sensing lines Y1 to Yn, wherein m and n are the same positive integer or different positive integers. The X-directional sensing lines X1 to Xm and the Y-directional sensing lines Y1 to Yn are embedded in different layers of the touch panel 10. Referring to FIG. 1, the X-directional sensing lines X1 to Xm and the Y-directional sensing lines Y1 to Yn are arranged in a staggered manner, thereby forming a sensing grid. In the sensing grid, a plurality of mutual capacitors 11 (not shown) are formed between every X-directional sensing line and every Y-directional sensing line. A plurality of parasitic capacitors (e.g., having self capacitance) 13 are formed between either every X-directional sensing line or every Y-directional sensing line and the ground. During operation of the conventional touch panel, a driving signal (e.g., a square wave signal) is inputted to a sensing line in a direction (e.g., an X-directional sensing line), while a sensing line in the other direction (e.g., a Y-directional sensing line) measures the coupling signal coupled with the X-directional sensing line to detect touch gesture. Since the conventional capacitive touch input device utilizes a single driving method to detect the touch gesture, it is difficult for touch panels with different loading capacitances to be applied to a variety of electronic devices due to limited options for compatibility or a limited hardware standard.

Therefore, there is a need to provide a touch input device capable of switching driving signals in accordance with a panel with different loading capacitances to solve the above problems.

SUMMARY OF THE INVENTION

The present invention discloses a touch input device for switching driving signals. The touch input device includes a touch panel and a panel driving circuit. The touch panel includes a plurality of X-directional sensing lines, a plurality of Y-directional sensing lines, and a plurality of mutual capacitors. The X-directional sensing lines and the Y-directional sensing lines are arranged in a staggered manner. The mutual capacitors are formed between every X-directional sensing line and every Y-directional sensing line. The panel driving circuit is configured for driving the touch panel. In addition, the panel driving circuit includes a selecting circuit, a driving signal generating circuit, and a touch sensing circuit. The selecting circuit includes a multiplexer and is configured for selecting and shifting an X-directional measuring channel or a Y-directional measuring channel in accordance with a predetermined number of the X-directional sensing lines and the Y-directional sensing lines. The driving signal generating circuit is configured for transmitting a driving signal to the X-directional measuring channel or the Y-directional measuring channel in accordance with a clock signal. The multiplexer controls the X-directional sensing lines and the Y-directional sensing lines that do not comprise the X-directional measuring channel or the Y-directional measuring channel to be grounded or floating in accordance with the driving signal. The touch sensing circuit is configured to detect two voltages of the Y-directional sensing lines in the Y-directional measuring channel, in order for a determining circuit to judge a touching position of a user.

The foregoing has outlined rather broadly the features and technical benefits of the disclosure in order that the detailed description of the invention that follows may be better understood. Additional features and benefits of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the disclosure. It should also be realized by those skilled in the art that such equivalent constructions do not depart from the spirit and scope of the invention as set forth in the appended claims.

BRIEF DESCRIPTION OF THE DRAWINGS

The invention will be described according to the appended drawings in which:

FIGS. 8 to 14 are schematic block diagrams of different driving methods in accordance with several embodiments of the present invention.

DETAILED DESCRIPTION OF THE INVENTION

The present invention is directed to a touch panel and a driving method thereof. In order to make the present invention completely comprehensible, detailed steps and structures are provided in the following description. Obviously, implementation of the present invention does not limit special details known by persons skilled in the art. In addition, known structures and steps are not described in detail, so as not to unnecessarily limit the present invention. Preferred embodiments of the present invention will be described below in detail. However, in addition to the detailed description, the present invention may also be widely implemented in other embodiments. The scope of the present invention is not limited to the detailed description, and is defined by the claims.

Figure 1:
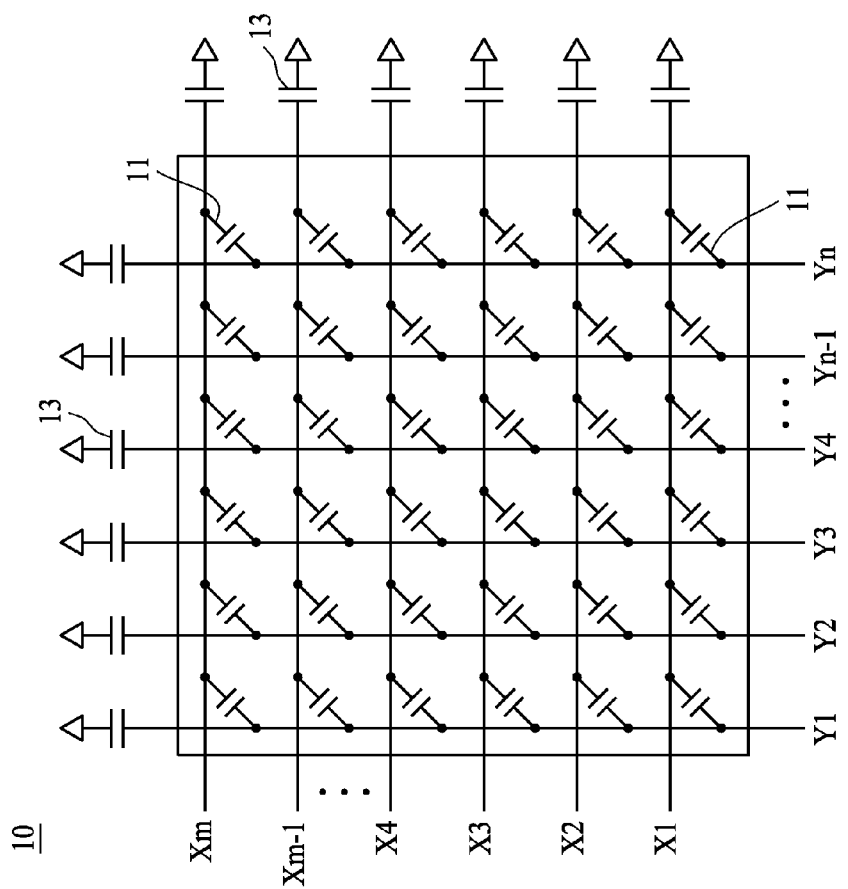
FIG. 1 is a schematic view of a conventional touch panel.
Figure 2:
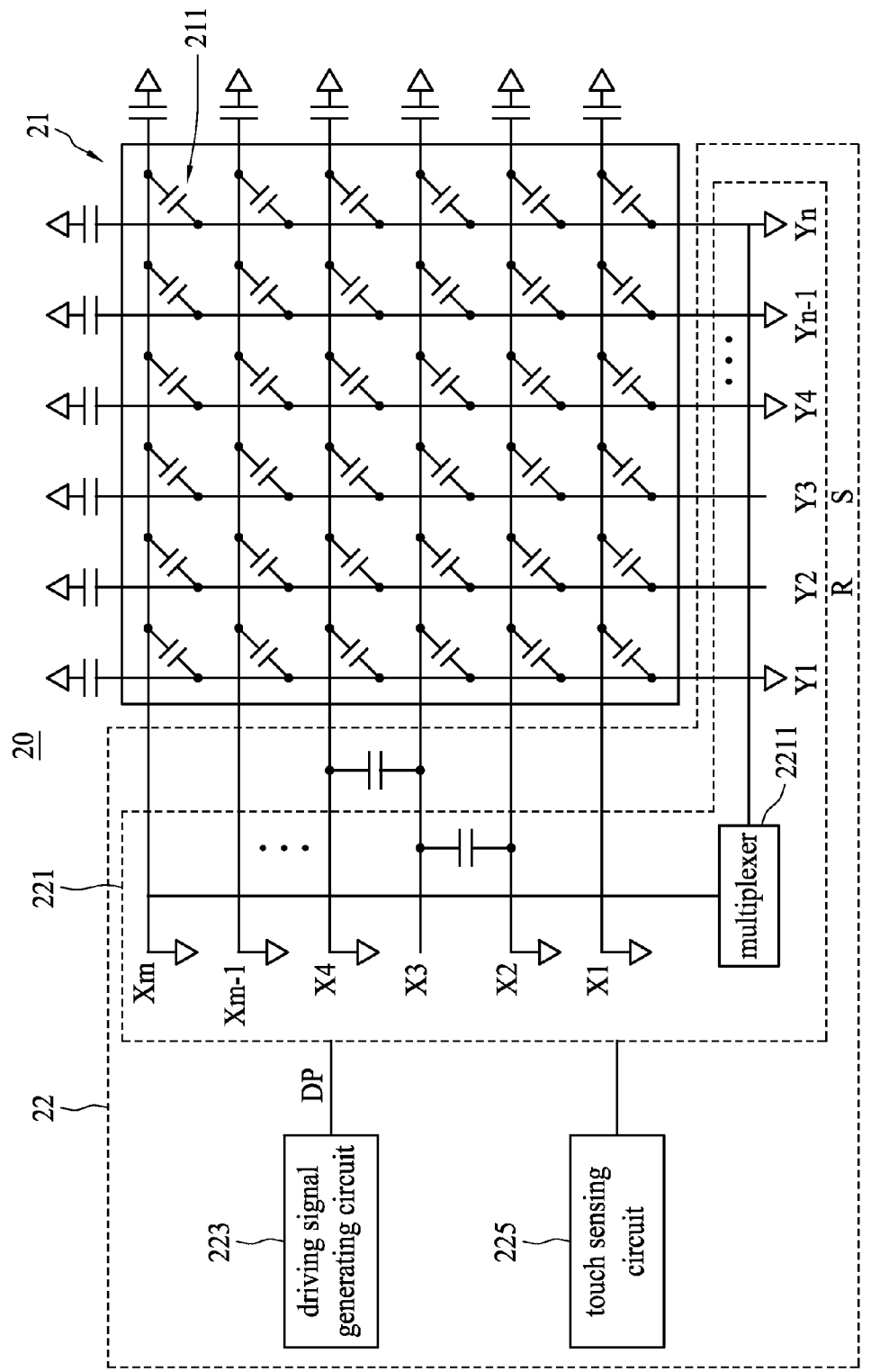
FIG. 2 is a schematic view of a touch input device in accordance with one embodiment of the present invention.

In order to fluently explain the present invention, the touch input device implemented by a driving method is disclosed. FIG. 2 is a schematic view of a touch input device 20 in accordance with one embodiment of the present invention. The touch input device 20 includes a touch panel 21 and a panel driving circuit 22, wherein the panel driving circuit 22 is configured for driving the touch panel 21. In the present embodiment, the touch panel 21 includes a plurality of X-directional sensing lines X1 to Xm and a plurality of Y-directional sensing lines Y1 to Yn. Referring to FIG. 2, the X-directional sensing lines X1 to Xm and the Y-directional sensing lines Y1 to Yn are arranged in a staggered manner to form a sensing grid. In the sensing grid of the touch panel 21, a plurality of mutual capacitors 211 are formed between every X-directional sensing line and every Y-directional sensing line.

In the embodiment shown in FIG. 2, the panel driving circuit 22 includes a selecting circuit 221, a driving signal generating circuit 223, and a touch sensing circuit 225. The selecting circuit 221 is configured for selecting and shifting an X-directional measuring channel or a Y-directional measuring channel in accordance with a predetermined number of the X-directional sensing lines and the Y-directional sensing lines. The selecting circuit 221 further includes a multiplexer 2211.

The driving signal generating circuit 223 transmits a driving signal DP to the X-directional sensing lines X1 to Xm and the Y-directional sensing lines Y1 to Yn in accordance with a clock signal clk. The driving signal DP can be selected from, but is not limited to, a square wave driving signal, a triangular driving signal, and a sinusoidal wave driving signal.

Figure 3:
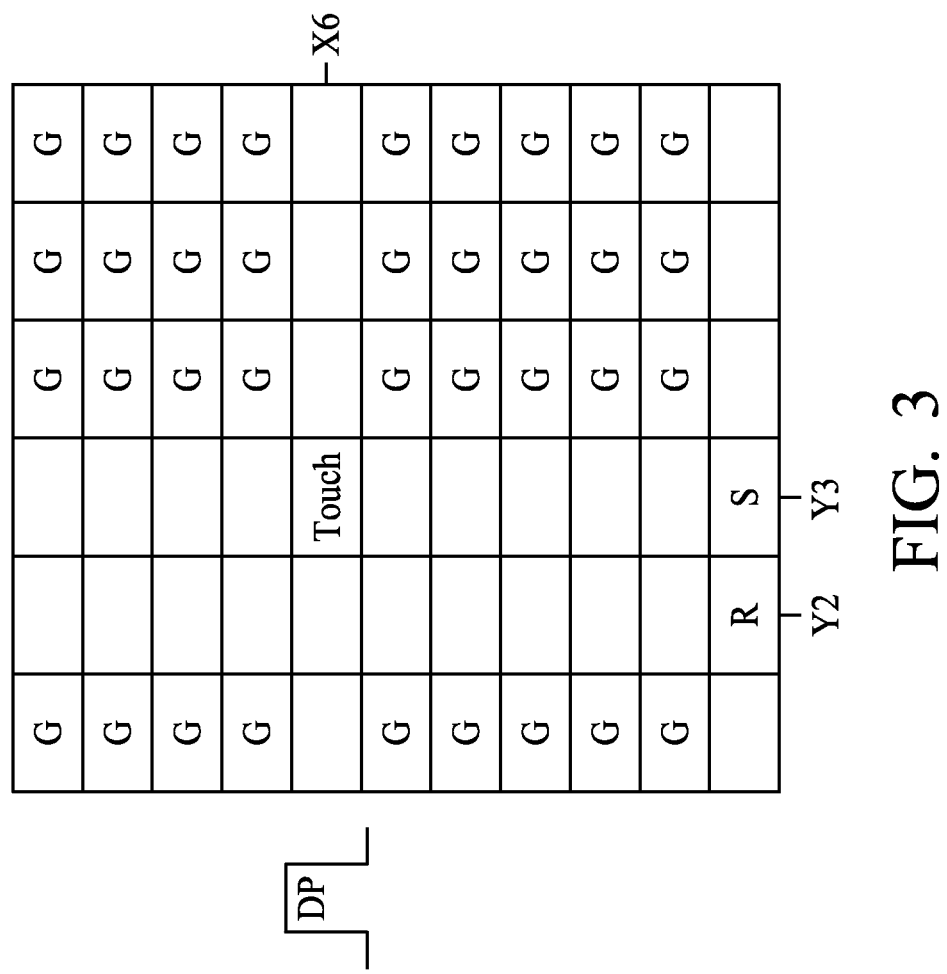
FIG. 3 is a schematic block diagram of a screening result of a driving method in accordance with one embodiment of the present invention.

Referring to the embodiment of the present invention shown in FIG. 2, the touch input device 20 incorporates a first driving method. After the driving signal generating circuit 223 generates the driving signal DP in accordance with the clock signal clk, the driving signal DP is transmitted to the selecting circuit 221, which selects and shifts an X-directional measuring channel or a Y-directional measuring channel in accordance with the predetermined number of the X-directional sensing lines and the Y-directional sensing lines. In the embodiment, the predetermined number of the X-directional sensing line is one, while the X-directional sensing line X6 of the sensing lines (including the X-directional sensing lines and the Y-directional sensing lines) is predetermined to be an initial X-directional measuring channel as shown in FIG. 3. Referring to FIGS. 2 and 3, during the first screening step, a driving signal DP is transmitted to the X-directional sensing line X6, while the voltage of the Y-directional sensing line Y2 can be transmitted to a first input terminal R of a differential detecting module (not shown) through a first multiplexer (not shown); meanwhile, the voltage of the Y-directional sensing line Y3 can be transmitted to a second input terminal S of the differential detecting module through a second multiplexer (not shown). The above-mentioned first multiplexer, the second multiplexer and the differential detecting module are part of the touch sensing circuit 225 of the present invention and are described in U.S. application Ser. No. 13/207,047, and the entirety of which is herein incorporated by reference.

In the embodiment of the present invention shown in FIG. 3, when the driving signal DP is transmitted to the selecting module 221, the multiplexer 2211 of the selecting module 221 controls the sensing lines which do not comprise the X-directional measuring channel (e.g., the X-directional sensing line X6) and the Y-directional measuring channel (e.g., the Y-directional sensing lines Y2, Y3) to be grounded (G) in accordance with the driving signal DP. Thus, the touch sensing circuit 225 generates a touch sensing signal in response to the voltage difference between the first multiplexer and the second multiplexer from the differential detecting module. In other words, the touch sensing circuit 225 is configured for detecting two voltages in the Y-directional measuring channels (e.g., the voltages R and S in the Y-directional sensing lines Y2, Y3). Since the multiplexer 2211 of the present invention can shift the X-directional measuring channel (e.g., the X-directional sensing line X6) to the Y-directional measuring channel (e.g., the Y-directional sensing lines Y2, Y3), the measuring channel of the present invention can be either one of the X-directional sensing lines or one of the Y-directional sensing lines. In other words, the multiplexer 2211 can switch the measuring channel from one of the X-directional sensing lines to one of the Y-directional sensing lines, or from one of the Y-directional sensing lines to one of the X-directional sensing lines. Furthermore, the present invention also includes a determining circuit (not shown), which is configured for judging the touching position in accordance with the voltages R and S detected by the touch sensing circuit 225.

Figure 4:
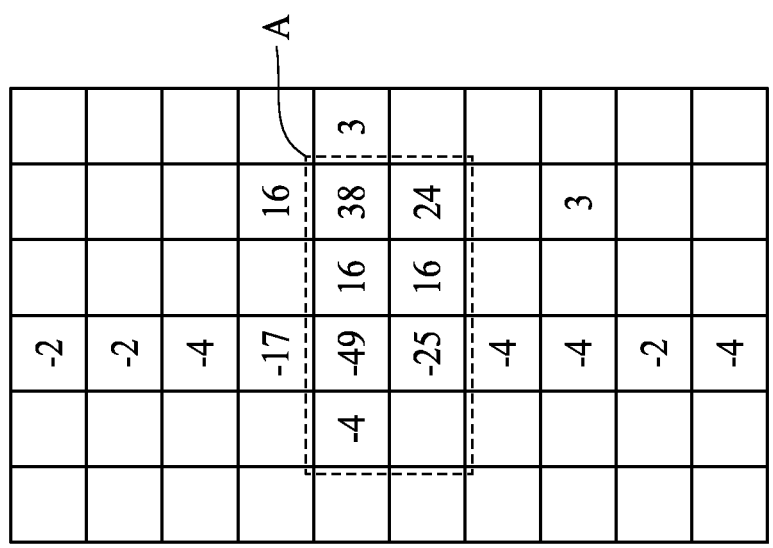
FIG. 4 is a schematic view showing raw data of the touching position outputted from the driving method of FIG. 3 after the touch panel is screened.

FIG. 4 illustrates the raw data of the touching position outputted by the analog to digital converting module (not shown) of the touch sensing circuit 225, after the touch input device 20 (shown in FIG. 2) screens the entire touch panel 21 (shown in FIG. 2). The raw data of the touch panel 21 is shown in FIG. 4, wherein the raw data for the touching positions having no number can be zero. After the raw data is inputted into the signal processing unit (not shown) of the touch sensing circuit 225, the dotted frame A is a touching position area judged by the signal processing unit. In the embodiment, the multiplexer 2211 allows the X-directional sensing lines, in which no driving signal inputs, and the Y-directional sensing lines, which do not couple to the measuring channel, to be grounded (G) as shown in FIG. 3. In other words, the X-directional sensing lines and the Y-directional sensing lines that do not comprise the X-directional measuring channel or the Y-directional measuring channel are grounded. By such design as shown in FIG. 4, the loading capacitance due to the driving signal DP is higher, but the number difference between the touching position area and the non-touching area is obvious in accordance with the raw data of the signal processing unit (not shown). Therefore, with respect to the judgment of the touching position through the signal processing unit, it is simple for the touch input device 20 to utilize the driving method as shown in FIG. 2, since the calculation of the number difference can be reduced; consequently, the hardware and power consumption in the signal processing unit can be reduced.

Figure 5:
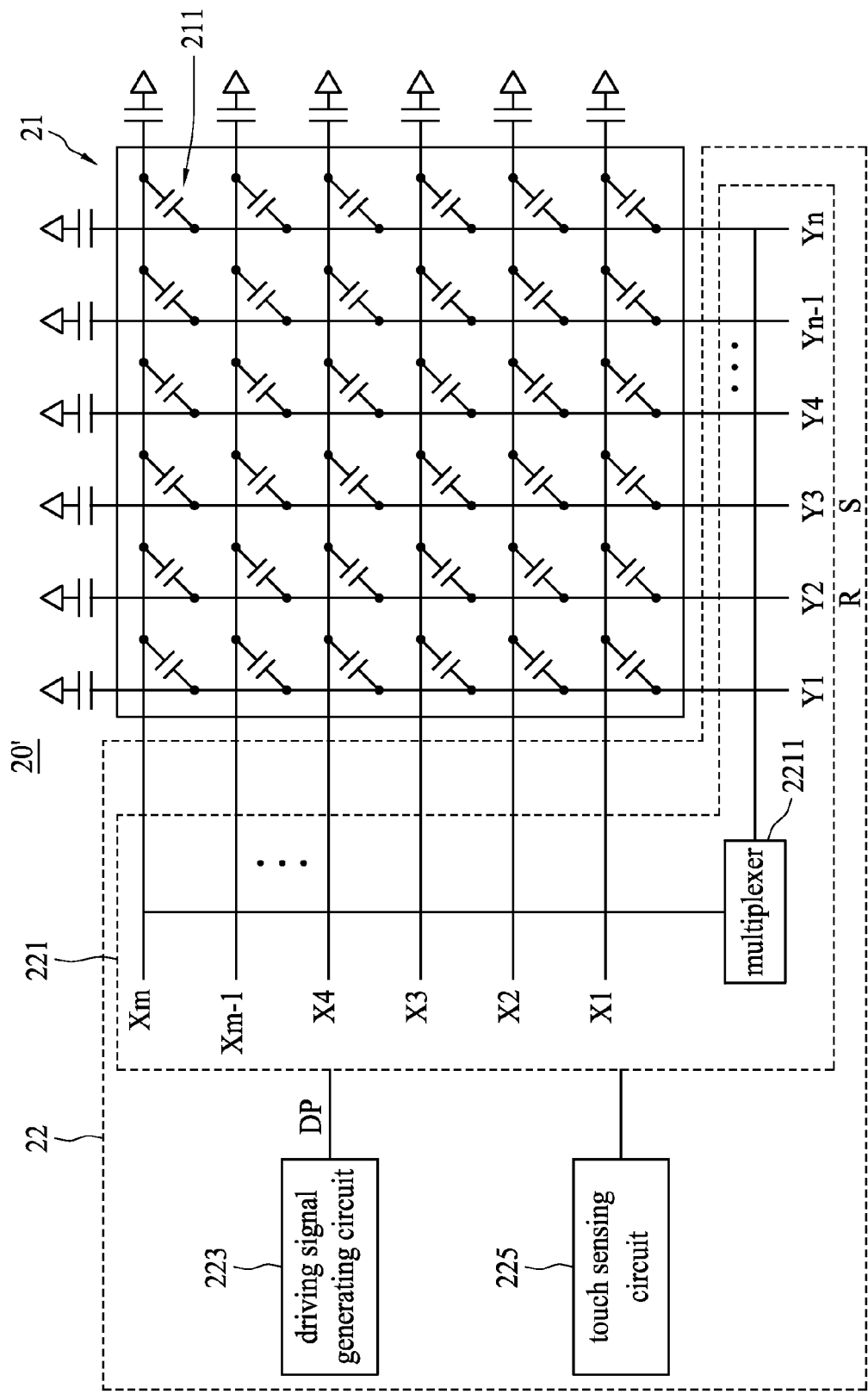
FIG. 5 is a schematic view of a touch input device in accordance with another embodiment of the present invention.

FIG. 5 discloses a touch input device 20', which is similar to the touch input device 20 shown in FIG. 2. When a clock generating circuit (not shown) generates a clock signal clk toward the driving signal generating circuit 223, the driving signal generating circuit 223 generates a driving signal DP toward the X-directional sensing lines X1 to Xm and the Y-directional sensing lines Y1 to Yn in accordance with the clock signal clk; meanwhile the touch input device 20' adapts a second driving method.

Figure 6:
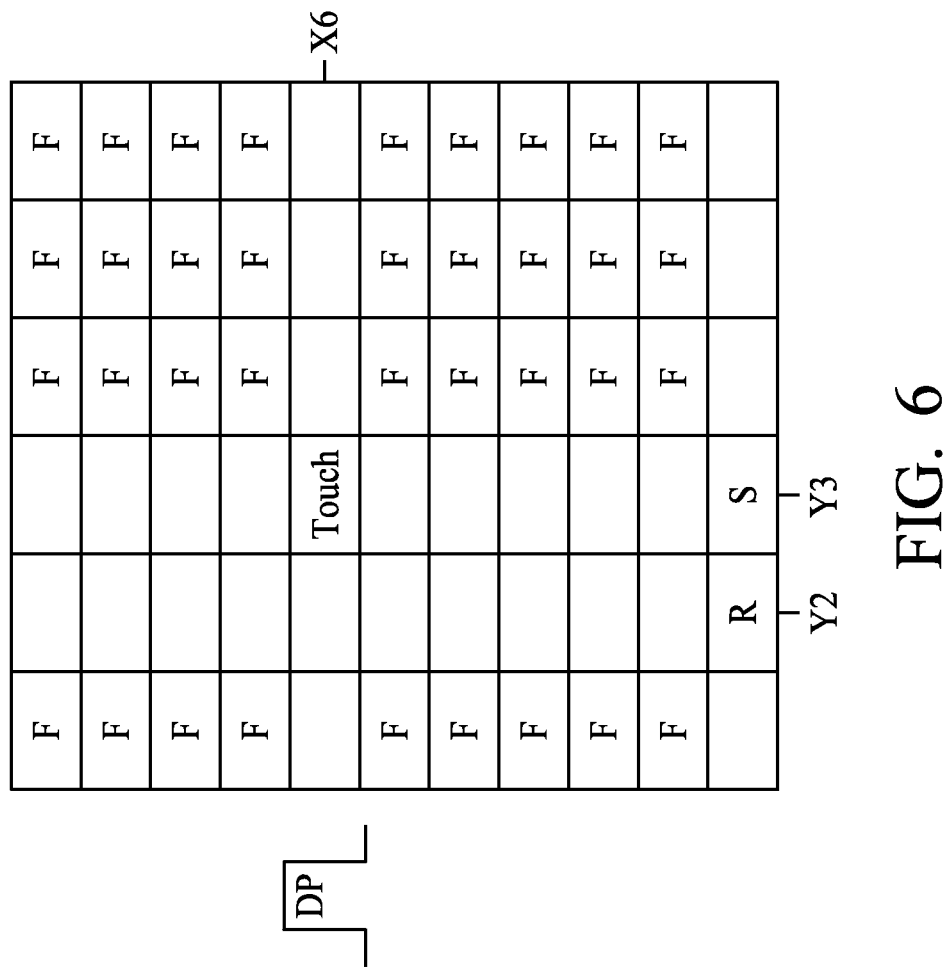
FIG. 6 is a schematic block diagram of a screening result of another driving method in accordance with another embodiment of the present invention.

After the driving signal generating circuit 223 generates the driving signal DP in accordance with the clock signal clk, the driving signal DP is transmitted to the selecting circuit 221, which selects and shifts the X-directional measuring channel or the Y-directional measuring channel in accordance with the predetermined number of the sensing lines. In the embodiment, the predetermined number of the sensing lines is one, while the X-directional sensing line X6 is predetermined as an initial X-directional measuring channel as shown in FIG. 6. Referring to FIGS. 5 and 6, during the first screening step, a driving signal DP is transmitted to the X-directional sensing line X6, while the voltage of the Y-directional sensing line Y2 can be transmitted to a first input terminal R of a differential detecting module (not shown) through a first multiplexer (not shown); meanwhile, the voltage of the Y-directional sensing line Y3 can be transmitted to a second input terminal S of the differential detecting module through a second multiplexer (not shown). The above-mentioned first multiplexer, the second multiplexer and the differential detecting module are part of the touch sensing circuit 225 of the present invention and are described in U.S. application Ser. No. 13/207,047, and the entirety of which is herein incorporated by reference. It should be noted that when the driving signal DP is transmitted to the selecting module 221, the multiplexer 2211 of the selecting module 221 controls the sensing lines that do not comprise the X-directional measuring channel (e.g., the X-directional sensing line X6) or the Y-directional measuring channel to be floating (F) in accordance with the driving signal DP as shown in FIG. 6. Furthermore, the touch sensing circuit 225 can detect the voltage difference between the voltage R detected by the first multiplexer (not shown) and the voltage S detected by the second multiplexer (not shown) through the differential detecting module (not shown) of the touch sensing circuit 225 so as to generate a touch sensing signal. The term "floating" means that the device receives no indication whether one of the sensing lines carries the driving voltage. In other words, the sensing line might maintain in a high resistance status. In addition, the present invention can further include a determining circuit (not shown), which is configured for judging the touching position of a user in accordance with the voltages (R and S) detected by the touch sensing circuit 225.

Figure 7:
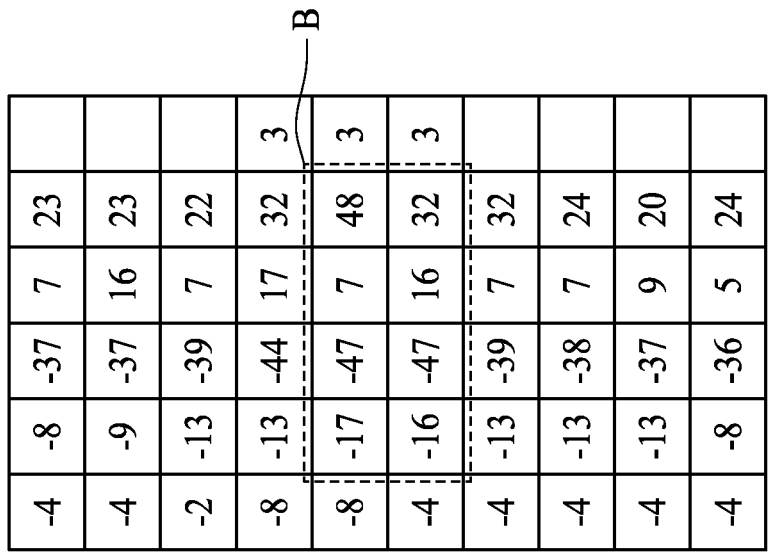
FIG. 7 is a schematic view showing raw data of the touching position outputted from the driving method of FIG. 6 after the touch panel is screened.

In the embodiment shown in FIG. 7, after the touch input device 20' (shown in FIG. 5) screens the entire touch panel 21 (shown in FIG. 5), the raw data of the touching position is outputted by the analog to digital converting module (not shown) of the touch sensing circuit 225. The raw data of the touch panel 21 is shown in FIG. 7. After the raw data is inputted into the signal processing unit (not shown) of the touch sensing circuit 225, the dotted frame B is a touch position area judged by the signal processing unit. In the embodiment, the multiplexer 2211 allows the X-directional sensing lines in which no driving signal inputs and the Y-directional sensing lines which are not coupled to the measuring channel to be floating (F) as shown in FIG. 6. In other words, the X-directional sensing lines and the Y-directional sensing lines that do not comprise the X-directional measuring channel or the Y-directional measuring channel are floating. By such design, the loading capacitance due to the driving signal DP of this driving method as shown in FIG. 7 is lower than the loading capacitance of the above-mentioned driving method as shown in FIG. 4, but the number difference between the touching position area and the non-touching area is more difficult to distinguish in accordance with the raw data of the signal processing unit (not shown). Therefore, with respect to the judgment of the touching position through the signal processing unit, the touch input device 20' requires a complex process to utilize the driving method as shown in FIG. 5, since the calculation of the number difference is complicated, requiring increased hardware and power consumption in the signal processing unit. Therefore, the multiplexer 2211 of the selecting circuit 221 of the present invention is flexible and capable of switching among different driving methods in response to touch panels with different loading capacitance so as to increase applications for various devices or fit into most hardware standards.

Figure 8:
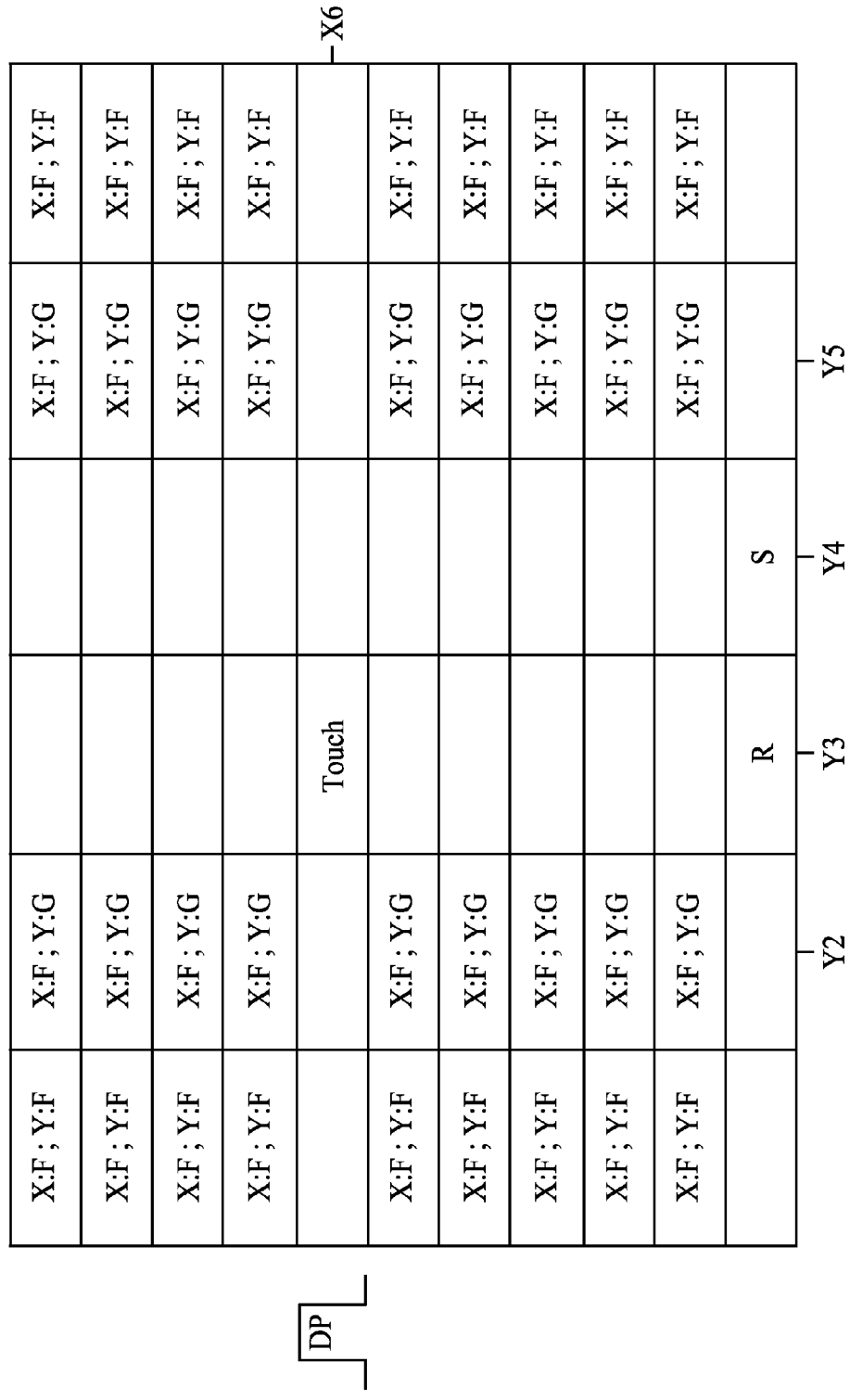
Figure 9:
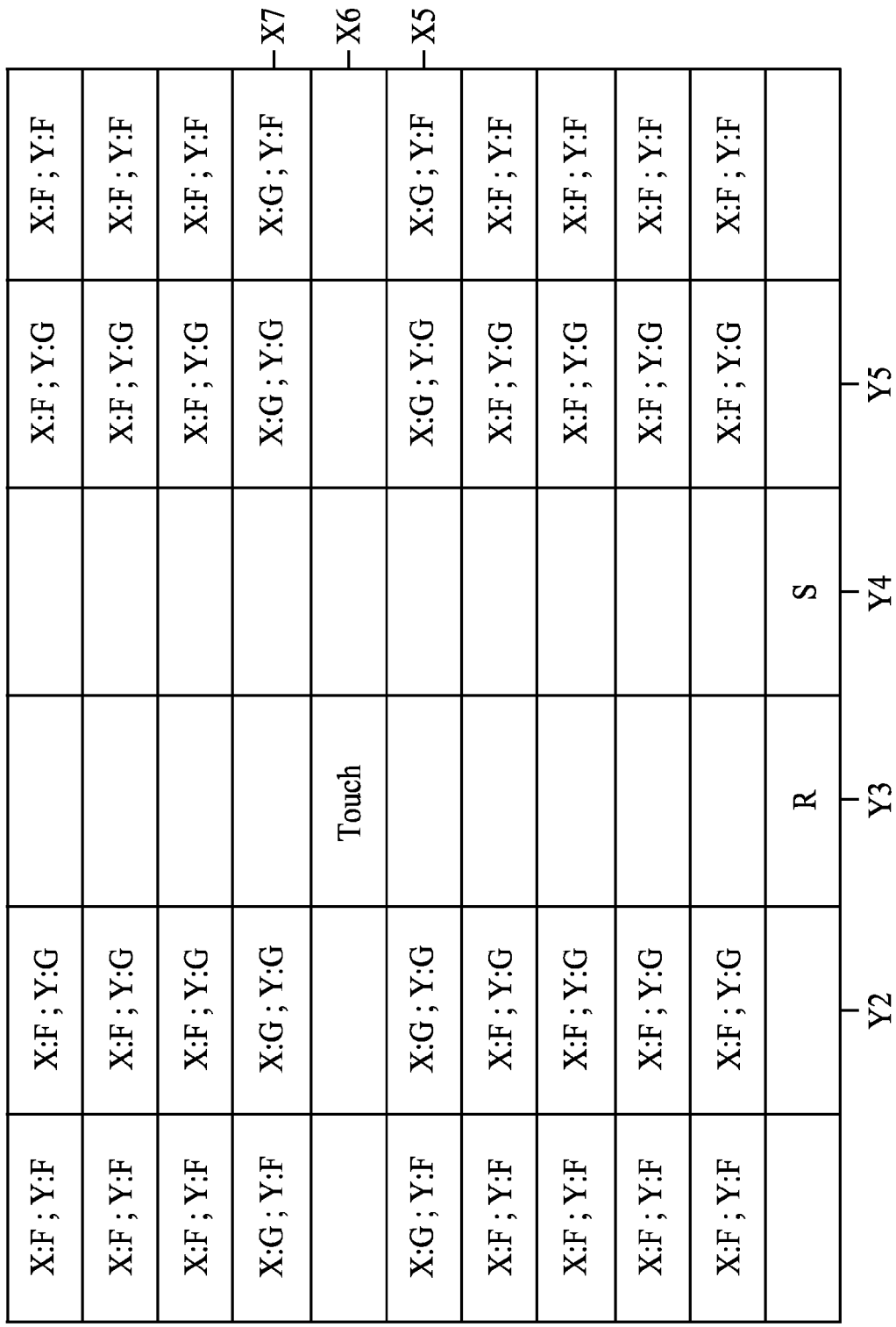
Figure 10:
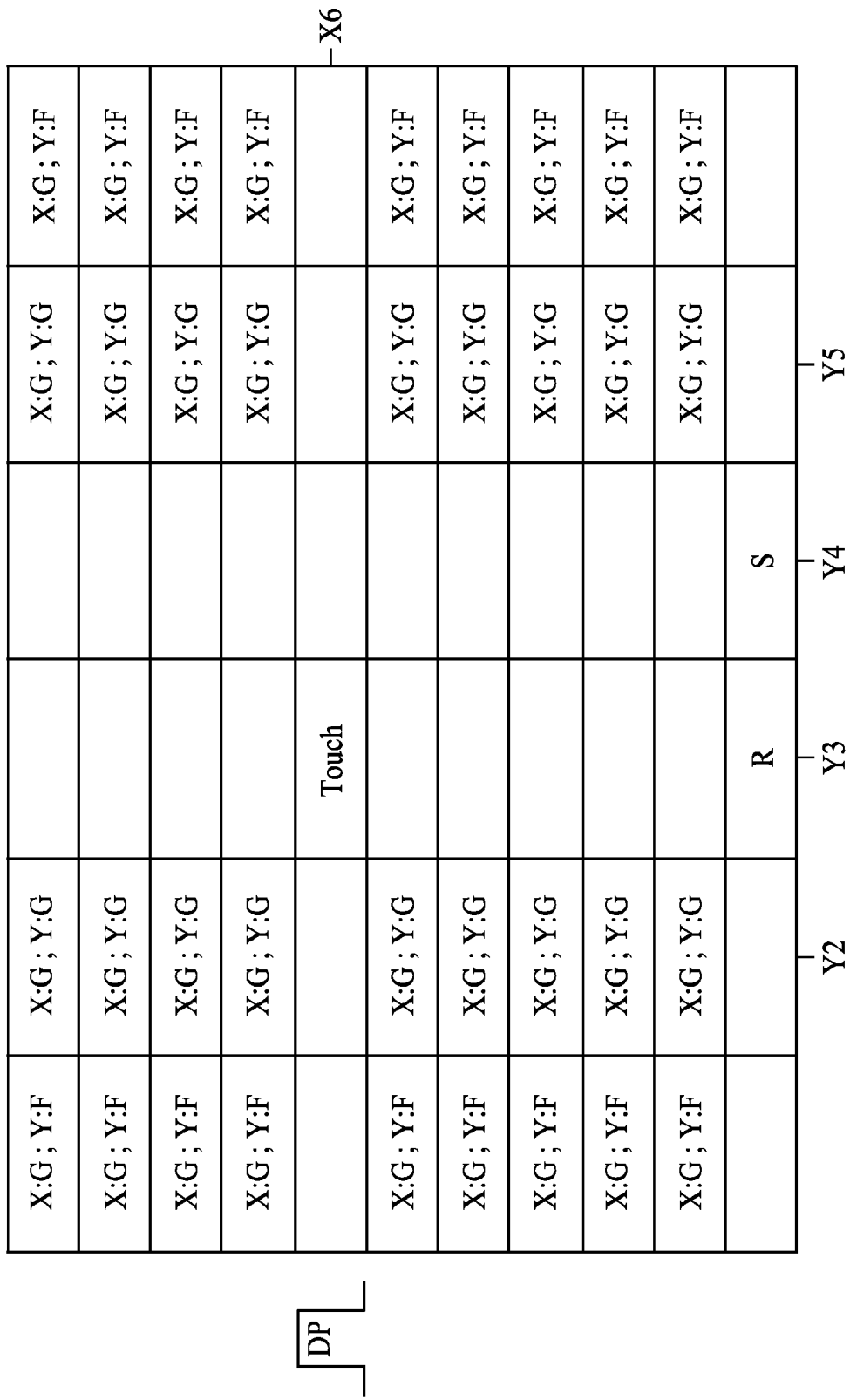
Figure 11:
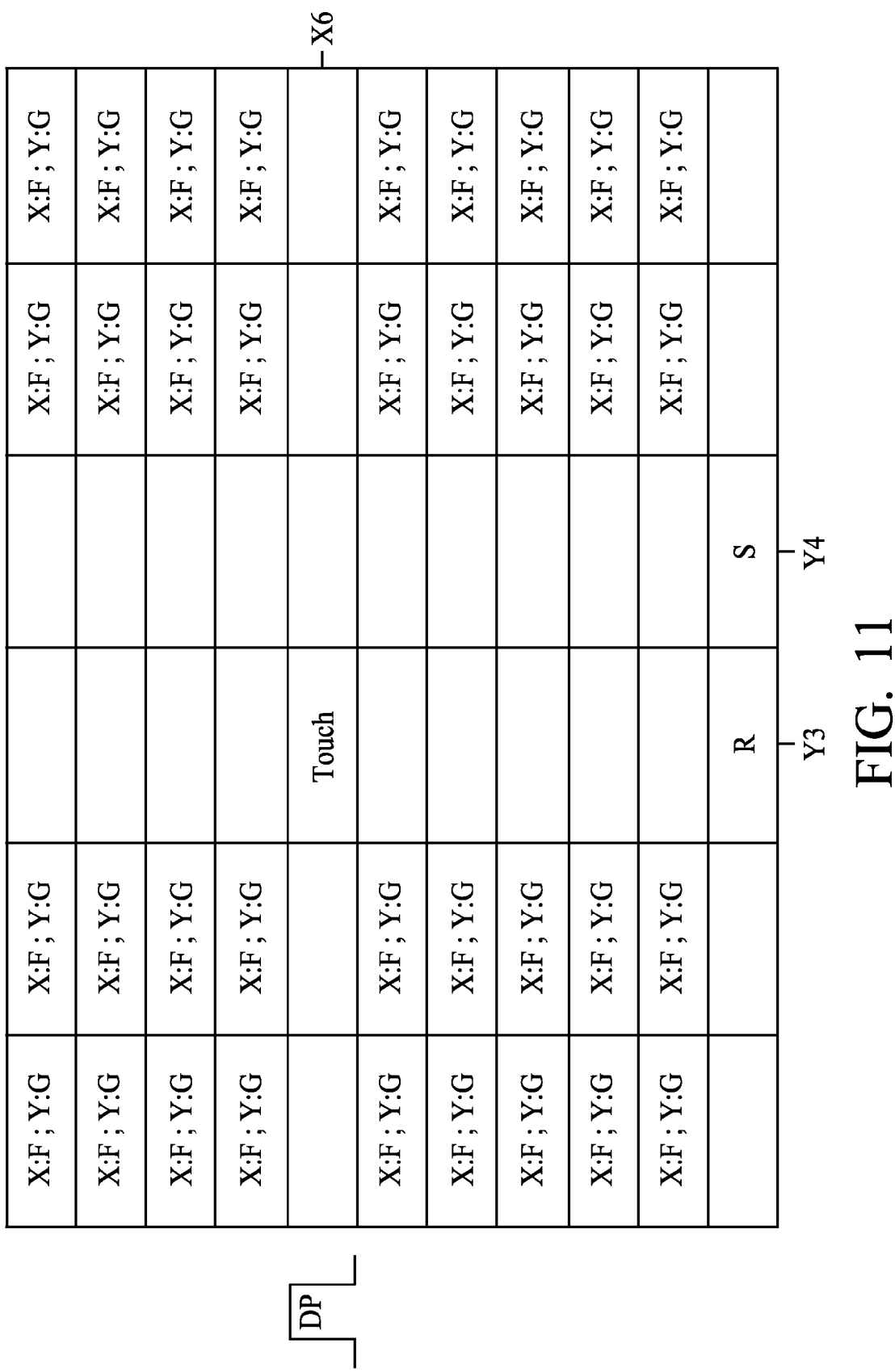
Figure 14:
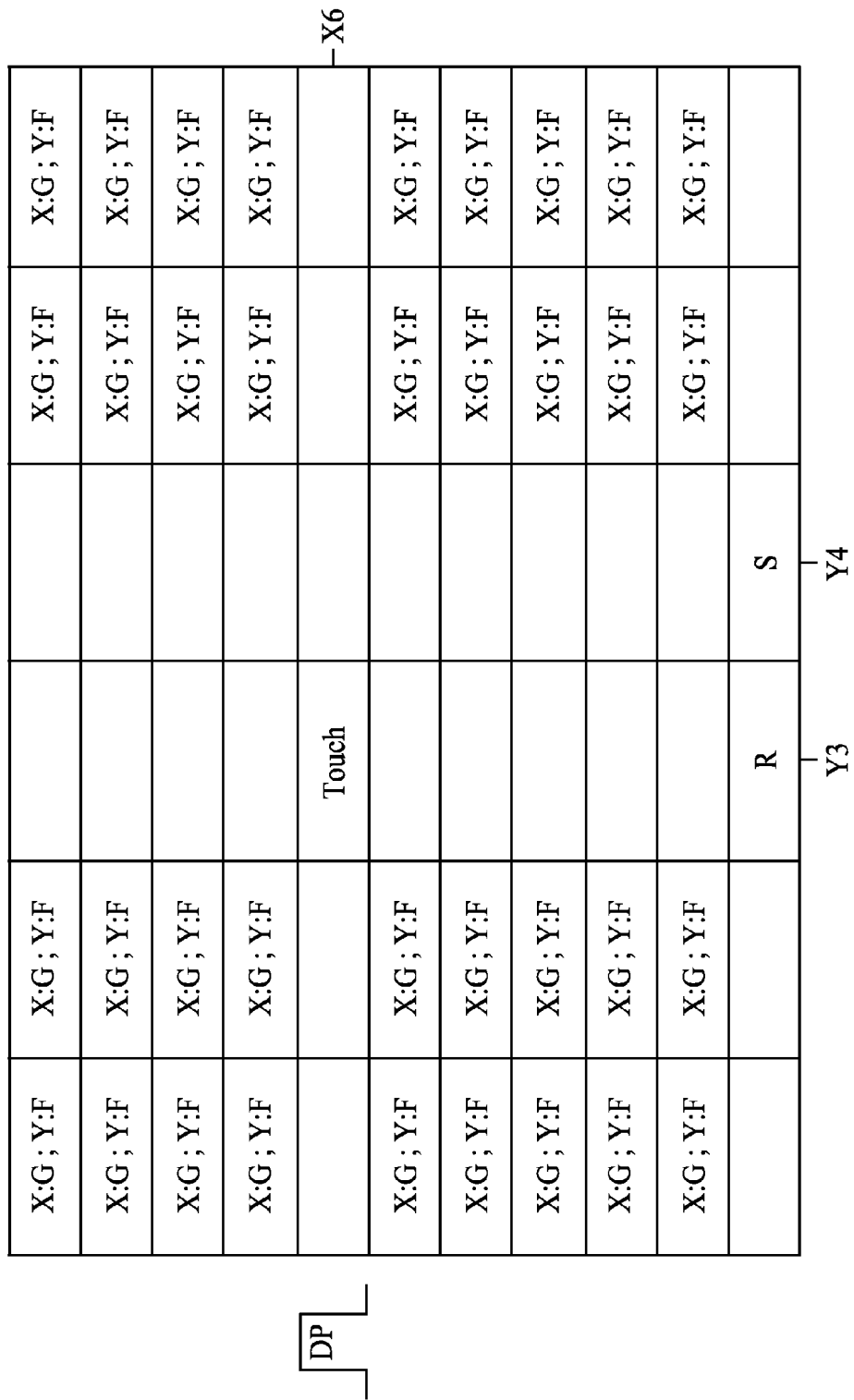

The multiplexer 2211 of the selecting circuit 221 can flexibly switch between the above-mentioned two driving methods. In another embodiment shown in FIG. 8, the multiplexer 2211 can switch to the driving method shown in FIG. 8 so as to allow two Y-directional sensing lines Y2, Y5, which are adjacent to the Y-directional measuring channel (two Y-directional sensing lines Y3, Y4) to be grounded (G), while the other Y-directional sensing lines and the X-directional sensing lines that do not comprise the X-directional measuring channel X6 are floating (F). In addition, the multiplexer 2211 of the present invention can be switched to allow two X-directional sensing lines X5, X7, which are adjacent to the X-directional measuring channel (e.g., the X-directional sensing line X6) to be grounded (G), to allow two Y-directional sensing lines Y2, Y5, which are adjacent to the Y-directional measuring channel (e.g., the two Y-directional sensing lines Y3, Y4) to be grounded (G), while the other X-directional sensing lines and the other Y-directional sensing lines are floating (F) as shown in FIG. 9. Furthermore, the driving method can be switched as shown in FIG. 10 to allow the X-directional sensing lines that do not comprise the X-directional measuring channel (e.g., the X-directional sensing line X6) to be grounded (G), to allow two Y-directional sensing lines Y2, Y5, which are adjacent to the Y-directional measuring channel (e.g., the two Y-directional sensing lines Y3, Y4) to be grounded (G), while the other Y-directional sensing lines are floating (F). As shown in FIG. 11, the driving method can be switched to allow the Y-directional sensing lines that do not comprise the Y-directional measuring channel (e.g., the two Y-directional sensing lines Y3, Y4) to be grounded (G), while the X-directional sensing lines that do not comprise the X-directional measuring channel (e.g., the X-directional sensing line X6) can be floating (F). In addition, as shown in FIG. 12, the driving method can be switched to allow two X-directional sensing lines X5, X7 adjacent to the X-directional measuring channel (e.g., the X-directional sensing line X6) to be grounded (G), to allow the Y-directional sensing lines that do not comprise the Y-directional measuring channel (e.g., the two Y-directional sensing lines Y3, Y4) to be grounded (G), while the other X-directional sensing lines are floating (F). In another embodiment, the driving method of the present invention as shown in FIG. 13 can be switched to allow two X-directional sensing lines X5, X7 adjacent to the X-directional measuring channel (e.g., the X-directional sensing line X6) to be grounded (G), while the other X-directional sensing lines and the Y-directional sensing lines that do not comprise the Y-directional measuring channel are floating (F). Furthermore, the driving method as shown in FIG. 14 can be switched to allow the X-directional sensing lines that do not comprise the X-directional measuring channel (e.g., the Y-directional sensing line X6) to be grounded (G), while the Y-directional sensing lines that do not comprise the Y-directional measuring channel are floating (F).

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A touch input device for switching driving signals, the touch input device comprising:
    a touch panel, including:
        a plurality of X-directional sensing lines;
        a plurality of Y-directional sensing lines, wherein the X-directional sensing lines and the Y-directional sensing lines are arranged in a staggered manner; and
        a plurality of mutual capacitors formed between every X-directional sensing line and every Y-directional sensing line; and
    a panel driving circuit, configured for driving the touch panel, the panel driving circuit comprising:
        a selecting circuit including a multiplexer, wherein the selecting circuit selects and shifts an X-directional measuring channel or a Y-directional measuring channel in accordance with a predetermined number of the X-directional sensing lines and Y-directional sensing lines;
        a driving signal generating circuit configured for transmitting a driving signal to the X-directional measuring channel or the Y-directional measuring channel in accordance with a clock signal, wherein the multiplexer controls the X-directional sensing lines and Y-directional sensing lines that do not comprise either the X-directional measuring channel or the Y-directional measuring channel to be grounded or floating in accordance with the driving signal; and
        a touch sensing circuit configured to detect two voltages of the Y-directional sensing lines in the Y-directional measuring channel, wherein when two Y-directional sensing lines, adjacent to the Y-directional measuring channel, are grounded, the other Y-directional sensing lines and the X-directional sensing lines that do not comprise the X-directional measuring channel are floating.

2. The touch input device according to claim 1, further comprising a determining circuit configured for judging a touch position in accordance with the two voltages detected by the touch sensing circuit.

3. A touch input device for switching driving signals, the touch input device comprising:
    a touch panel, including:
        a plurality of X-directional sensing lines;
        a plurality of Y-directional sensing lines, wherein the X-directional sensing lines and the Y-directional sensing lines are arranged in a staggered manner; and
        a plurality of mutual capacitors formed between every X-directional sensing line and every Y-directional sensing line; and
    a panel driving circuit, configured for driving the touch panel, the panel driving circuit comprising:
        a selecting circuit including a multiplexer, wherein the selecting circuit selects and shifts an X-directional measuring channel or a Y-directional measuring channel in accordance with a predetermined number of the X-directional sensing lines and Y-directional sensing lines;
        a driving signal generating circuit configured for transmitting a driving signal to the X-directional measuring channel or the Y-directional measuring channel in accordance with a clock signal, wherein the multiplexer controls the X-directional sensing lines and Y-directional sensing lines that do not comprise either the X-directional measuring channel or the Y-directional measuring channel to be grounded or floating in accordance with the driving signal; and
        a touch sensing circuit configured to detect two voltages of the Y-directional sensing lines in the Y-directional measuring channel, wherein when two X-directional sensing lines adjacent to the X-directional measuring channel and two Y-directional sensing lines adjacent to the Y-directional measuring channel are grounded, the other Y-directional sensing lines and the other X-directional sensing lines are floating.

4. A touch input device for switching driving signals the touch input device comprising:
    a touch panel, including:
        a plurality of X-directional sensing lines;
        a plurality of Y-directional sensing lines, wherein the X-directional sensing lines and the Y-directional sensing lines are arranged in a staggered manner; and
        a plurality of mutual capacitors formed between every X-directional sensing line and every Y-directional sensing line; and
    a panel driving circuit, configured for driving the touch panel, the panel driving circuit comprising:
        a selecting circuit including a multiplexer, wherein the selecting circuit selects and shifts an X-directional measuring channel or a Y-directional measuring channel in accordance with a predetermined number of the X-directional sensing lines and Y-directional sensing lines;
        a driving signal generating circuit configured for transmitting a driving signal to the X-directional measuring channel or the Y-directional measuring channel in accordance with a clock signal, wherein the multiplexer controls the X-directional sensing lines and Y-directional sensing lines that do not comprise either the X-directional measuring channel or the Y-directional measuring channel to be grounded or floating in accordance with the driving signal; and
    a touch sensing circuit configured to detect two voltages of the Y-directional sensing lines in the Y-directional measuring channel, wherein when the X-directional sensing lines that do not comprise the X-directional measuring channel and two Y-directional sensing lines adjacent to the Y-directional measuring channel are grounded, then the other Y-directional sensing lines are floating.

5. A touch input device for switching driving signals, the touch input device comprising:

a touch panel, including:
  a plurality of X-directional sensing lines;
  a plurality of Y-directional sensing lines, wherein the X-directional sensing lines and the Y-directional sensing lines are arranged in a staggered manner; and
  a plurality of mutual capacitors formed between every X-directional sensing line and every Y-directional sensing line; and
a panel driving circuit, configured for driving the touch panel, the panel driving comprising:
  a selecting circuit including a multiplexer, wherein the selecting circuit selects and shifts an X-directional measuring channel or a Y-directional measuring channel in accordance with a predetermined number of the X-directional sensing lines and Y-directional sensing lines;
  a driving signal generating circuit configured for transmitting a driving signal to the X-directional measuring channel or the Y-directional measuring channel in accordance with a clock signal, wherein the multiplexer controls the X-directional sensing lines and Y-directional sensing lines that do not comprise either the X-directional measuring channel or the Y-directional measuring channel to be grounded or floating in accordance with the driving signal; and
  a touch sensing circuit configured to detect two voltages of the Y-directional sensing lines in the Y-directional measuring channel, wherein when two X-directional sensing lines adjacent to the X-directional measuring channel and the Y-directional sensing lines that do not comprise the Y-directional measuring channel are grounded, then the other X-directional sensing lines are floating.

6. A touch input device for switching driving signals, the touch input device comprising:
a touch panel, including:
  a plurality of X-directional sensing lines;
  a plurality of Y-directional sensing lines, wherein the X-directional sensing lines and the Y-directional sensing lines are arranged in a staggered manner; and
  a plurality of mutual capacitors formed between every X-directional sensing line and every Y-directional sensing line; and
a panel driving circuit, configured for driving the touch panel, the panel driving circuit comprising:
  a selecting circuit including a multiplexer, wherein the selecting circuit selects and shifts an X-directional measuring channel or a Y-directional measuring channel in accordance with a predetermined number of the X-directional sensing lines and Y-directional sensing lines;
  a driving signal generating circuit configured for transmitting a driving signal to the X-directional measuring channel or the Y-directional measuring channel in accordance with a clock signal, wherein the multiplexer controls the X-directional sensing lines and Y-directional sensing lines that do not comprise either the X-directional measuring channel or the Y-directional measuring channel to be grounded or floating in accordance with the driving signal; and
  a touch sensing circuit configured to detect two voltages of the Y-directional sensing lines in the Y-directional measuring channel, wherein when two X-directional sensing lines adjacent to the X-directional measuring channel are grounded, then the other X-directional sensing lines and the Y-directional sensing lines that do not comprise the Y-directional measuring channel are floating.

* * * * *